No. 668,001. Patented Feb. 12, 1901.
A. ANDERSON.
PLOW PULVERIZER.
(Application filed Aug. 29, 1900.)
(No Model.)
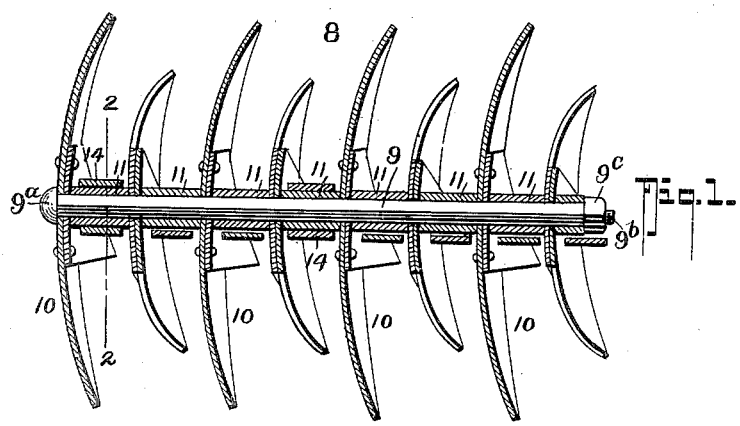
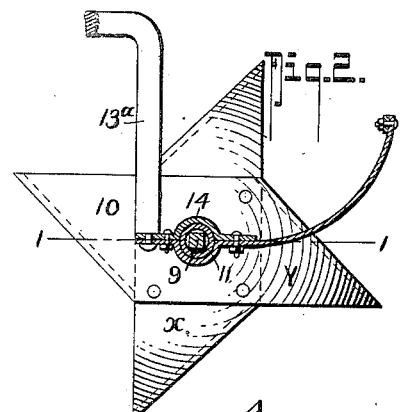
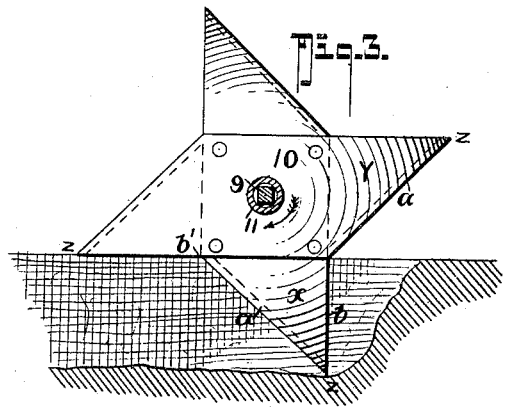
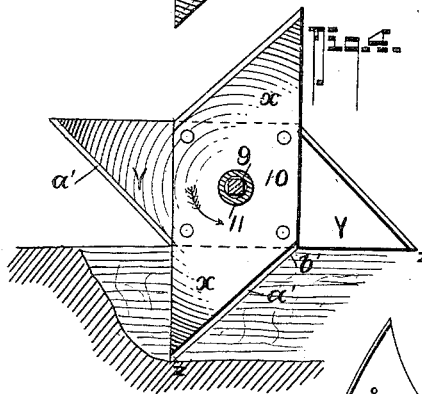
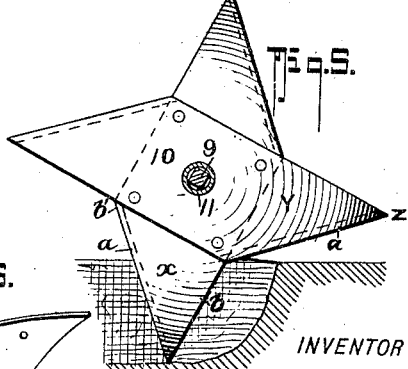
WITNESSES:
Louis Dieterich
F. P. Hinkel
INVENTOR
Anton Anderson
BY
Fred G. Dieterich
ATTORNEYS
THE NORRIS PETERS CO., PHOTO-LITHO., WASHINGTON, D. C.

UNITED STATES PATENT OFFICE.

ANTON ANDERSON, OF MENOMONIE, WISCONSIN.

PLOW-PULVERIZER.

SPECIFICATION forming part of Letters Patent No. 668,001, dated February 12, 1901.

Application filed August 29, 1900. Serial No. 28,426. (No model.)

*To all whom it may concern:*

Be it known that I, ANTON ANDERSON, residing at Menomonie, in the county of Dunn and State of Wisconsin, have invented a new and Improved Plow-Pulverizer, of which the following is a specification.

This invention relates to improvements in that type of pulverizers or disk harrows having the disk members formed with radially-extending blade or earth-penetrating portions.

My invention in its more generic features comprehends a novel construction of the disk members involving a special correlation of the several penetrating-blades, whereby they effect a plow-point-cutting action as they enter the ground.

My invention also seeks to provide an improved type of pulverizer-disks having the blades or cutters relatively so arranged and constructed that they will penetrate hard ground easier with less power, work the ground deeper, and pulverize the same better, and particularly so in "threshy" ground, than is possible to do with the ordinary type of radial-tooth pulverizer or rotary-harrow disks.

I am aware that heretofore harrow-disks have been provided composed of a series of crosswise-held blades or members, the penetrating ends of which project radially and are curved to effect a shearing action as they enter the ground.

My invention, while involving the same general idea of the cross-member disk construction just referred to, differentiates therefrom in that all the penetrating ends of my disk construction have a peculiar shape, whereby any one of the said ends will effect a certain cutting or digging action independent of the other ends and each end member will also have a coöperating action with the next preceding one of the other ends to effect a quick earth turning and pulverizing action. Again, my invention seeks to provide in its complete make-up a novel construction of disk having a series of uniformly-arranged radial blades in which the penetrating ends have like shapes, but in which all of the penetrating ends have such a relative and coöperative arrangement as to effect a continuous cut or opening of the earth and the turning of the same in a manner the same as is effected by the use of an ordinary plow-point.

In the drawings, Figure 1 is a vertical longitudinal section of a set of harrow-disks constructed in accordance with my invention, taken substantially on the line 1 1 of Fig. 2. Fig. 2 is a transverse section taken on the line 2 2 of Fig. 1. Fig. 3 is a front view of one of the plow-acting pulverizing-disks, showing the correlation of two of the penetrating ends at one position of the disks. Fig. 4 is a rear elevation of the disk at the same position. Fig. 5 is a front view showing the disk in a position whereby the forward penetrating end (indicated by $x$) is shown just leaving the cut, and the next end (indicated by $y$) as following in the cut made by $x$. Figs. 6 and 7 are detail views of the two-part disk and the means for mounting the same.

In the practical application of my invention the harrow-disks may be suitably supported on the ordinary type of frame. In the drawings I have illustrated a set of my improved harrow-disks and a shaft-section with which said disks rotate, which shaft-section may be supported on the harrow-frame (not shown) in any approved manner—for example, on pendent arm or arms $13^a$, as shown in Fig. 2.

8 indicates a harrow-disk section, and the same comprises a number of disks 10, mounted to rotate with a shaft 9, that passes through all of the disks of a section, said shaft having a head $9^a$ at one end and a threaded shank $9^b$ at the opposite end to receive the clamping-nut $9^c$, the several disks in each section being held spaced apart by the intervening tubular members 11. (See Fig. 3.) The shaft 9 in practice is suitably supported on the harrow-frame, and to securely hold the shaft 9 upon its supporting arm or arms $13^a$ cap-plates 14 are provided, as shown best in Fig. 2. All of the disks 10 are constructed alike. A detailed description of one and its manner of operation will therefore be given. It should be stated, however, that to effect a more perfect pulverizing the blades are set alternately—that is, the radial or penetrating ends of each alternate disk are made to project in a line between a pair of ends of the disk in front of it, as will be readily understood by reference to Fig. 1.

By referring now more particularly to Figs. 4, 5, and 6, which illustrate the construction of one of the disks in detail, it will be observed each disk consists of two members $x$ $y$ of like construction, each member having a rhomboidal shape, whereby two of diametrically opposite ends have a plow-point shape. The members $x$ and $y$ are made of such width and the angle of the cutting edge $a$ is such that when the two plates are fitted upon each other at right angles the cutting edges $a$ of one member will terminate at the body-lines $b$ of the other member, the reason for which will presently appear. Both members $x$ and $y$ have a concaved shape in longitudinal direction, and the two plates are riveted or otherwise made fast to each other to provide, as it were, a single disk having four radially-projecting penetrating and cutting ends. The cutting edges $a$ of the disks having a shear edge $a'$, as best shown in Fig. 4, which edge extends from the plow or penetrating point $z$ to the point where the inner end of the edge $a$ bisects the straight or body portion of the opposing member.

By constructing the disks in the manner described it will be readily understood that as the machine is drawn forward and the disk rotates in the direction indicated by the arrow in Fig. 3 the plow-point or penetrating end will enter the ground to a considerable depth, the cutting action being facilitated by the engagement of the front end of the cutting edge $a$ engaging in advance of the point $z$, which operation continues until the heel portion $b'$ of the blade $x$ begins to rise out of the cut, when the heel part $b'$ of the edge $a$ of the next blade (indicated by $y$) will enter the cut started by $x$ and continue the cut in a forward direction, (see Fig. 3,) the blades $x$ and $y$ during their cutting action turning the earth over and leaving the turned earth in position to be so engaged by the series of disks as to be pulverized or reduced in a quick and effective manner.

It will be apparent that by arranging the blades in the manner shown I obtain practically the continuous cut made by a solid disk blade and at the same time the advantages of a pointed blade-disk. Thus the several disks will be properly guided over the surface to be pulverized. From practical experience I have discovered that by continuing the edges $a$ from the body of one to the body of the other crossing member of the disk the ground can be worked finer and deeper, particularly in threshy ground, than is possible with disks having radial blades which are separated from each other—that is, have an intervening space between the heel part of one blade and the straight penetrating edge of the next blade. Furthermore, by reason of the formation of my disk blades the blades are in the nature of rotary plow-points that enter the ground in the manner of an ordinary plow-point and turn it in the same manner.

It is preferable to make the disks of two separated rhomboidal-shaped members. The disks may, however, be made of a single member with the blades projected and formed as hereinbefore described.

Having thus described my invention, what I claim, and desire to secure by Letters Patent, is—

1. A rotary pulverizing-disk, consisting of two like members, each having a rhomboidal shape, the two members crossing each other, and having a relative width and their ends so inclined that the inclined edge of one member stops at the adjacent straight edge of the other member, substantially as shown and described.

2. A pulverizing-disk, comprising a two-part body, each part being constructed alike and each consisting of a member concaved in longitudinal direction, and having a rhomboidal shape, the inclined ends being sharpened to produce cutting edges $a$, the two members crossing each other at right angles, the heel of the cutting edge $a$, of one member terminating at the straight wall of the penetrating edge of the other member, all being arranged substantially as shown and for the purposes described.

ANTON ANDERSON.

Witnesses:
CHAS. M. BORCHERS,
ALTE TIKKING.